US006794922B2

(12) United States Patent

Mashimo

(10) Patent No.: US 6,794,922 B2

(45) Date of Patent: Sep. 21, 2004

(54) SIGNAL PROCESSING CIRCUIT INTEGRATING PULSE WIDTHS OF AN INPUT PULSE SIGNAL ACCORDING TO POLARITIES

(75) Inventor: Akira Mashimo, Tokorozawa (JP)

(73) Assignee: Teac Corporation, Tokyo (JP)

( * ) Notice: Subject to any disclaimer, the term of this patent is extended or adjusted under 35 U.S.C. 154(b) by 21 days.

(21) Appl. No.: 10/081,344

(22) Filed: Feb. 20, 2002

(65) Prior Publication Data

US 2002/0113639 A1 Aug. 22, 2002

(30) Foreign Application Priority Data

Feb. 20, 2001 (JP) ....................................... 2001-044223
Oct. 30, 2001 (JP) ....................................... 2001-333102

(51) Int. Cl.[7] ................................................ G06F 7/64

(52) U.S. Cl. ........................................ 327/336; 327/337

(58) Field of Search ....................... 327/91–94, 336–344

(56) References Cited

U.S. PATENT DOCUMENTS 5,912,703 A * 6/1999 Tamayama .................. 348/241
6,342,817 B1 * 1/2002 Crofts et al. ................ 331/1 R

* cited by examiner

*Primary Examiner*—Kenneth B. Wells

(74) *Attorney, Agent, or Firm*—Anderson Kill & Olick, P.C.; Eugene Lieberstein; Michael N. Meller

(57) ABSTRACT

A signal processing circuit outputs an output signal corresponding to a pulse width of an input pulse signal. This signal processing circuit comprises means for accumulating pulse widths of the input pulse signal for a predetermined period of time, and means for outputting the output signal corresponding to the accumulated pulse width. Each of these pulse widths has one of positive and negative polarities.

18 Claims, 10 Drawing Sheets

SIGNAL PROCESSING CIRCUIT INTEGRATING PULSE WIDTHS OF AN INPUT PULSE SIGNAL ACCORDING TO POLARITIES

BACKGROUND OF THE INVENTION

1. Field of the Invention

The present invention generally relates to a signal processing circuit and a signal processing method, and more particularly, to a signal processing circuit and a signal processing method for converting a pulse signal into digital data corresponding to a pulse width of the pulse signal.

2. Description of the Related Art

FIG. 1 is a block diagram of an optical disk device. FIG. 2 is an illustration used for explaining a structure of an optical disk.

An optical disk device 100 shown in FIG. 1 is a CD-R drive, for example. A CD-R disk 40 is mounted on the optical disk device 100. The optical disk device 100 records/reproduces information on/from the CD-R disk 40.

On the CD-R disk 40, wobbles 40*b* are formed along tracks 40*a* on/from which information is recorded/reproduced, as shown in FIG. 2. Each of the wobbles 40*b* has a modulated frequency. Reproducing the wobble 40*b* and demodulating the frequency of the reproduction signal generates a frequency-demodulated signal. Accordingly, various control information recorded as the frequency-demodulated signal can be obtained.

The optical disk device 100 comprises an optical system 41, a spindle motor 42, a sled motor 43, a laser driver 44, a front monitor 45, an ALPC (Auto Laser Power Control) circuit 46, a recording compensation circuit 47, a wobble signal processing unit 48, an RF amplifier 49, a focus/tracking servo circuit 50, a feed servo circuit 51, a spindle servo circuit 52, a CD encode/decode circuit 53, a D/A converter 54, an audio amplifier 55, RAMs 56 and 58, a CD-ROM encode/decode circuit 57, an interface/buffer controller 59, and a CPU 60. The optical disk device 100 records/reproduces information according to commands transmitted from a host computer 61.

The spindle motor 42 is driven by the spindle servo circuit 52 so as to revolve the disk 40 at a predetermined revolving speed. The optical system 41 is arranged opposite the disk 40. The optical system 41 projects a laser light on the disk 40 so as to record information on the disk 40. The optical system 41 also receives a light reflected from the disk 40 so as to output a reproduction signal corresponding to information recorded on the disk 40. The optical system 41 is controlled by the sled motor 43 and the focus/tracking servo circuit 50 so as to project a light beam at a predetermined position B on the disk 40.

In this course, the sled motor 43 is driven and controlled by the feed servo circuit 51 so as to move a carriage composing the optical system 41 in a radial direction of the disk 40. The focus/tracking servo circuit 50 drives and controls a focus/tracking actuator (not shown in the figure) of the optical system 41 so as to perform a focus/tracking control.

The reproduction signal reproduced by the optical system 41 is supplied to the RF amplifier 49 The RF amplifier 49 amplifies the reproduction signal. A main signal of the reproduction signal is supplied to the CD encode/decode circuit 53, and is decoded by the CD encode/decode circuit 53.

The CD-ROM encode/decode circuit 57 performs processes, such as processes of encoding/decoding ECC (Error Correction Coding) typical of a CD-ROM, and a process of detecting a header. The RAM 56 is used as a working storage for the processes performed by the CD-ROM encode/decode circuit 57. The interface/buffer controller 59 transmits and receives data to/from the host computer 61, and controls a data buffer. The RAM 58 is used as a working storage for the interface/buffer controller 59.

Besides, when the disk 40 is an audio disk, the signal demodulated by the CD encode/decode circuit 53 is supplied to the D/A converter 54, and is converted from digital to analog. Then, the analog signal is amplified and output by the audio amplifier 55.

The CPU 60 controls the optical disk device 100 as a whole according to commands transmitted from the host computer 61.

As mentioned above, on an optical disk such as a CD-R, wobbles are formed beforehand along tracks on which information is to be recorded. The wobbles are detected so as to reproduce a wobble signal. The wobble signal has a modulated frequency. This frequency-modulated (FM) signal is converted into digital data so as to obtain information such as an address indicating a position on the disk. In this course, to obtain accurate information such as an address, the frequency-modulated signal needs to be converted accurately into digital data.

FIG. 3 is a block diagram of an example of a conventional signal processing circuit. FIG. 4 and FIG. 5 are timing charts of the conventional signal processing circuit.

In FIG. 3, a signal processing circuit 100 comprises a both-edge detection circuit 111, a counter circuit 112, a latch circuit 113, and a digital LPF circuit 114.

The both-edge detection circuit 111 is supplied with a frequency-modulated signal indicated by FIG. 4-(A) from a terminal 115. The both-edge detection circuit 111 first compares the supplied frequency-modulated (FM) signal with a zero level so as to generate a pulse signal indicated by FIG. 4-(B). The pulse signal becomes high-level when the supplied frequency-modulated signal is higher than the zero level, and becomes low-level when the supplied frequency-modulated signal is lower than the zero level. Then, the both-edge detection circuit 111 detects a rising edge and a falling edge of the generated pulse signal so as to generate a both-edge signal (numbered 118 in FIG. 3) indicated by FIG. 4-(C). This both-edge signal is supplied to the counter circuit 112, the latch circuit 113 and the digital LPF circuit 114.

The counter circuit 112 is cleared by the both-edge signal supplied from the both-edge detection circuit 111. The counter circuit 112 counts clocks supplied from a clock terminal 116. The counter circuit 112 supplies the counted values varying as indicated by FIG. 4-(D) to the latch circuit 113.

The latch circuit 113 is supplied with the counted values from the counter circuit 112 and the both-edge signal from the both-edge detection circuit 111 so as to latch the counted values N1 to Nn. The latch circuit 113 supplies the latched counted values N1 to Nn to the digital LPF circuit 114.

The digital LPF circuit 114 is supplied with the counted values from the latch circuit 113 and the both-edge signal from the both-edge detection circuit 111. The digital LPF circuit 114 digitally performs a low pass filtering process based on the counted values supplied from the latch circuit 113 so as to cut off noise components. The frequency-modulated (FM) signal subjected to the digital filtering process is output from a terminal 117, and then is subjected to a demodulating process so as to extract information superimposed on the wobble signal.

However, noises are superimposed on the frequency-modulated signal supplied to the both-edge detection circuit 111.

The frequency-modulated signal supplied to the both-edge detection circuit 111 crosses the zero level a plurality of times due to the noises, as shown in a magnified view in the vicinity of the zero level in FIG. 5. Therefore, when the frequency-modulated signal in this state is converted into the pulse signal, unnecessary pulses occur before and after the pulse signal, as indicated by FIG. 6-(A). Due to these unnecessary pulses, a rising edge and a falling edge are detected a plurality of times, as indicated by FIG. 6-(B). Accordingly, when clocks indicated by FIG. 6-(C) are counted between the edges indicated by FIG. 6-(B), a multitude of small counted values are output in the vicinity of the zero level, as indicated by FIG. 6-(D).

Thereupon, there has been proposed a method for detecting the edges of the pulse signal while excluding periods influenced by the noises. A description will be given, with reference to FIG. 7, of the method for detecting the edges of the pulse signal while excluding periods influenced by the noises.

FIG. 7-(A) indicates an input pulse signal. FIG. 7-(B) indicates the pulse signal rid of influences of noises (i.e., a chattering). FIG. 7-(C) indicates a both-edge signal of the pulse signal rid of influences of noises.

Conventionally, when the pulse signal continues for a predetermined period of time T3, an edge is detected. Although the input pulse signal indicated by FIG. 7-(A) rises at a time t1, the input pulse signal falls before the predetermined period of time T3 elapses, so that no edge is detected. On the other hand, since the input pulse signal indicated by FIG. 7-(A) rises at a time t2 and a time t7, and continues to be high-level for the predetermined period of time T3, so that an edge is detected.

Similarly, although the input pulse signal indicated by FIG. 7-(A) falls at a time t4, the input pulse signal rises before the predetermined period of time T3 elapses, so that no edge is detected. On the other hand, since the input pulse signal indicated by FIG. 7-(A) falls at a time t5 and a time t9, and continues to be low-level for the predetermined period of time T3, so that an edge is detected.

Thus, the both-edge signal indicated by FIG. 7-(C) rid of influences of noises is detected.

As described above, an actual frequency-modulated signal includes noises which causes rises and falls in the pulse signal. Accordingly, when edges of the pulse signal are detected, the edges include pulses due to the noises. Therefore, counting clocks between the edges in this state causes problems such as noise components being also output as counted values, which disables an accurate signal processing.

Additionally, the method described above with reference to FIG. 7 has problems such as that the edges cannot always be detected accurately, because a measurement of the period of time T3 is performed with respect to each individual pulse of the input pulse signal, and thus is likely to be influenced by one particular noise component.

SUMMARY OF THE INVENTION

It is a general object of the present invention to provide an improved and useful signal processing circuit and a signal processing method in which the above-mentioned problems are eliminated.

A more specific object of the present invention is to provide a signal processing circuit and a signal processing method which can accurately detect a high-level period and/or a low-level period of an input pulse signal excluding influences of noise components.

In order to achieve the above-mentioned objects, there is provided according to one aspect of the present invention a signal processing circuit outputting an output signal corresponding to a pulse width of an input pulse signal, the circuit comprising:

integrating means for integrating pulse widths of the input pulse signal for a predetermined period of time, each of the pulse widths having one of polarities; and outputting means for outputting the output signal corresponding to the pulse widths integrated by the integrating means.

Additionally, in the signal processing circuit according to the present invention, the integrating means may comprise a charging circuit storing a charged voltage according to either of polarities of the input pulse signal; and a sample hold circuit sampling and holding the charged voltage stored according to one of the polarities, during a period of the input pulse signal having the other of the polarities and including no chattering.

Additionally, in the signal processing circuit according to the present invention, the charging circuit may include a first charge circuit charged with a constant current during a period of the input pulse signal having a positive polarity; and a second charge circuit charged with a constant current during a period of the input pulse signal having a negative polarity, the sample hold circuit may include a first comparing circuit comparing a charged voltage of the first charge circuit with a reference voltage;

a second comparing circuit comparing a charged voltage of the second charge circuit with a reference voltage;

a first sample hold circuit sampling and holding the charged voltage of the second charge circuit, based on a comparison result of the first comparing circuit; and a second sample hold circuit sampling and holding the charged voltage of the first charge circuit, based on a comparison result of the second comparing circuit, and the outputting means may output a voltage sampled and held in the first sample hold circuit, according to the comparison result of the first comparing circuit, and outputs a voltage sampled and held in the second sample hold circuit, according to the comparison result of the second comparing circuit.

Additionally, in the signal processing circuit according to the present invention, the first sample hold circuit may include a first switch circuit switched according to the comparison result of the first comparing circuit; and a first capacitor charged according to the charged voltage of the second charge circuit, when the first switch circuit is switched on, and the second sample hold circuit may include a second switch circuit switched according to the comparison result of the second comparing circuit; and a second capacitor charged according to the charged voltage of the first charge circuit, when the second switch circuit is switched on.

Additionally, in the signal processing circuit according to the present invention, the first charge circuit may include a first constant current source outputting the constant current;

a first charging switch circuit switched on when the input pulse signal has a positive polarity so as to output the constant current output from the first constant current source;

a third capacitor charged with the constant current output from the first charging switch circuit, when the first charging switch circuit is switched on; and a first discharging switch circuit switched on according to the comparison result of the second comparing circuit so as to discharge the third capacitor, and the second charge circuit may include a second constant current source outputting the constant current;

a second charging switch circuit switched on when the input pulse signal has a negative polarity so as to output the constant current output from the second constant current source;

a fourth capacitor charged with the constant current output from the second charging switch circuit, when the second charging switch circuit is switched on; and a second discharging switch circuit switched on according to the comparison result of the first comparing circuit so as to discharge the fourth capacitor.

Additionally, in the signal processing circuit according to the present invention, the charging circuit may include a constant current source generating a constant current;

a first charge element charged with the constant current;

a second charge element charged with the constant current; and a switch switched according to the input pulse signal so as to supply the first charge element with the constant current generated by the constant current source when the input pulse signal has the one of the polarities, and to supply the second charge element with the constant current generated by the constant current source when the input pulse signal has the other of the polarities.

Additionally, in the signal processing circuit according to the present invention, the outputting means may comprise an output circuit outputting a voltage sampled and held in the sample hold circuit as the output signal.

Additionally, in the signal processing circuit according to the present invention, the output circuit may include a switch circuit selectively outputting either of the voltage sampled and held in the first sample hold circuit and the voltage sampled and held in the second sample hold circuit; and a switch control circuit switching the switch circuit so as to select the voltage sampled and held in the first sample hold circuit according to the comparison result of the first comparing circuit, and to select the voltage sampled and held in the second sample hold circuit according to the comparison result of the second comparing circuit.

According to the present invention, integrating pulse widths of the input pulse signal having one of the polarities enables the detection of a period of the input pulse signal having one of the polarities, excluding influences of a chattering.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 8:
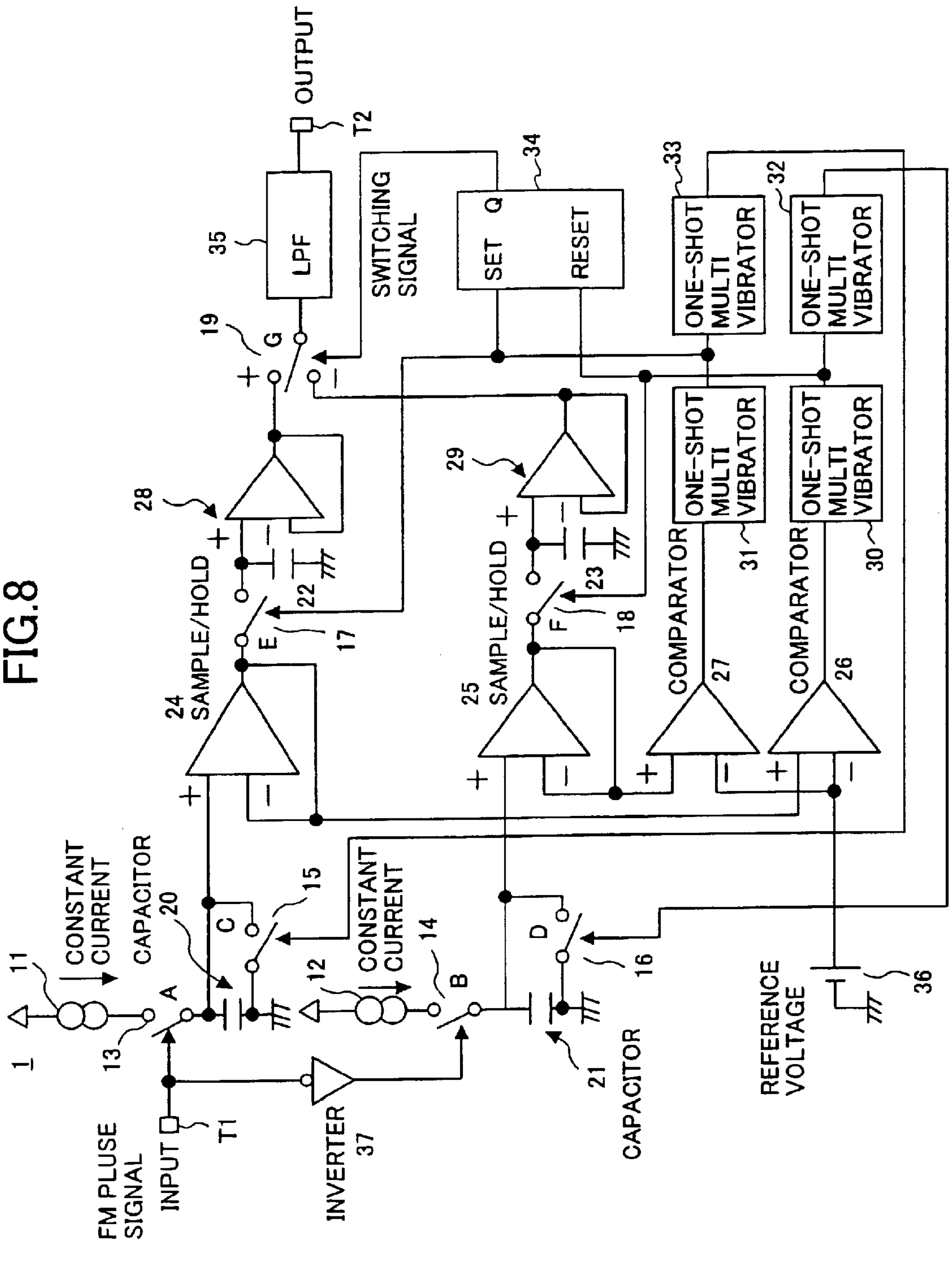
FIG. 8 is a block diagram of a signal processing circuit according to an embodiment of the present invention.

FIG. 8 is a circuit diagram of a signal processing circuit according to an embodiment of the present invention.

Figure 1:
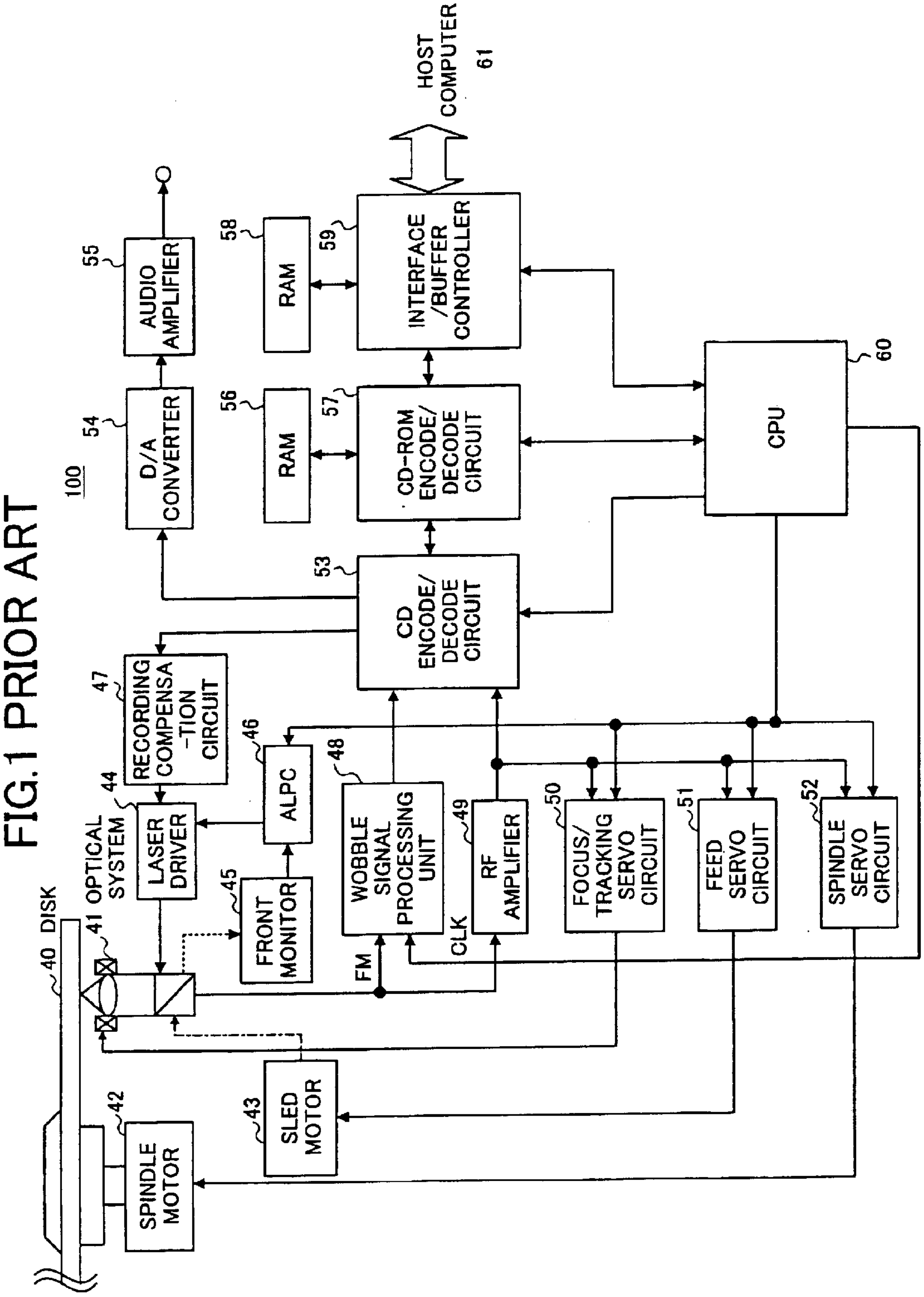
FIG.1 PRIOR ART
FIG. 1 is a block diagram of an optical disk device.
Figure 2:
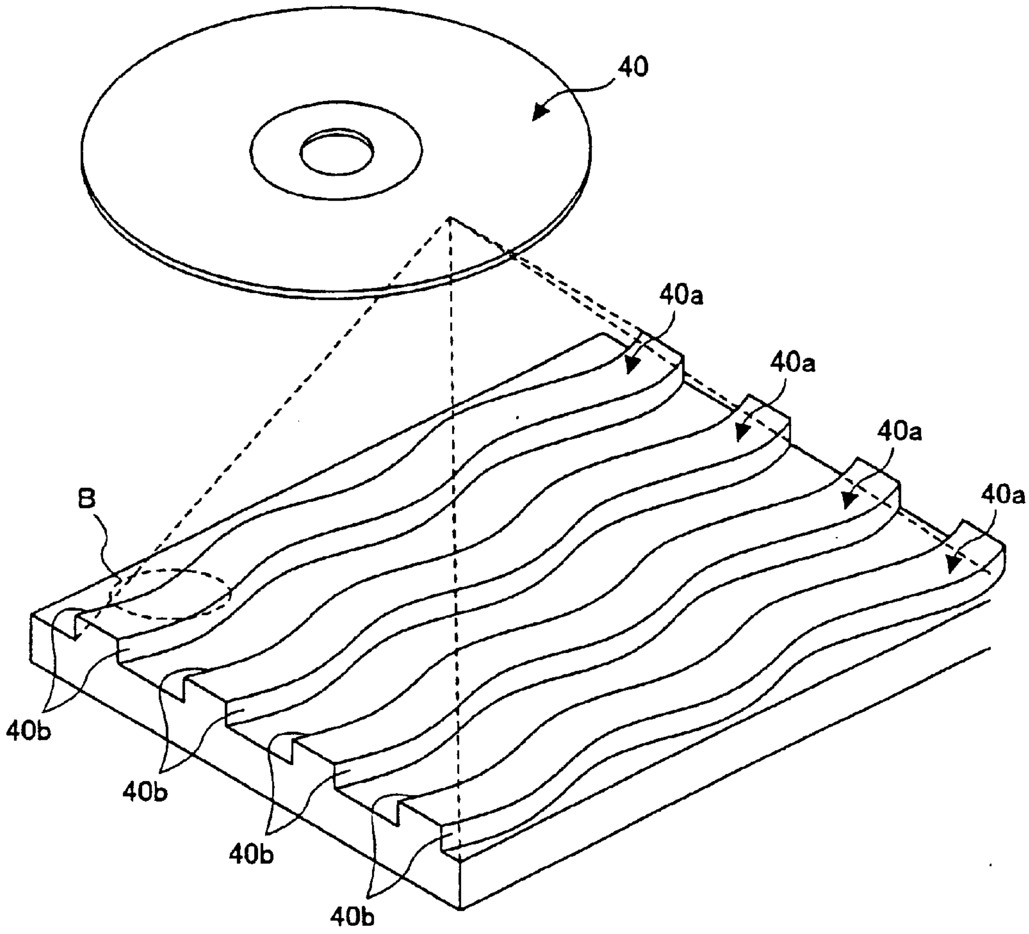
FIG. 2 PRIOR ART
FIG. 2 is an illustration used for explaining a structure of an optical disk.
Figure 3:
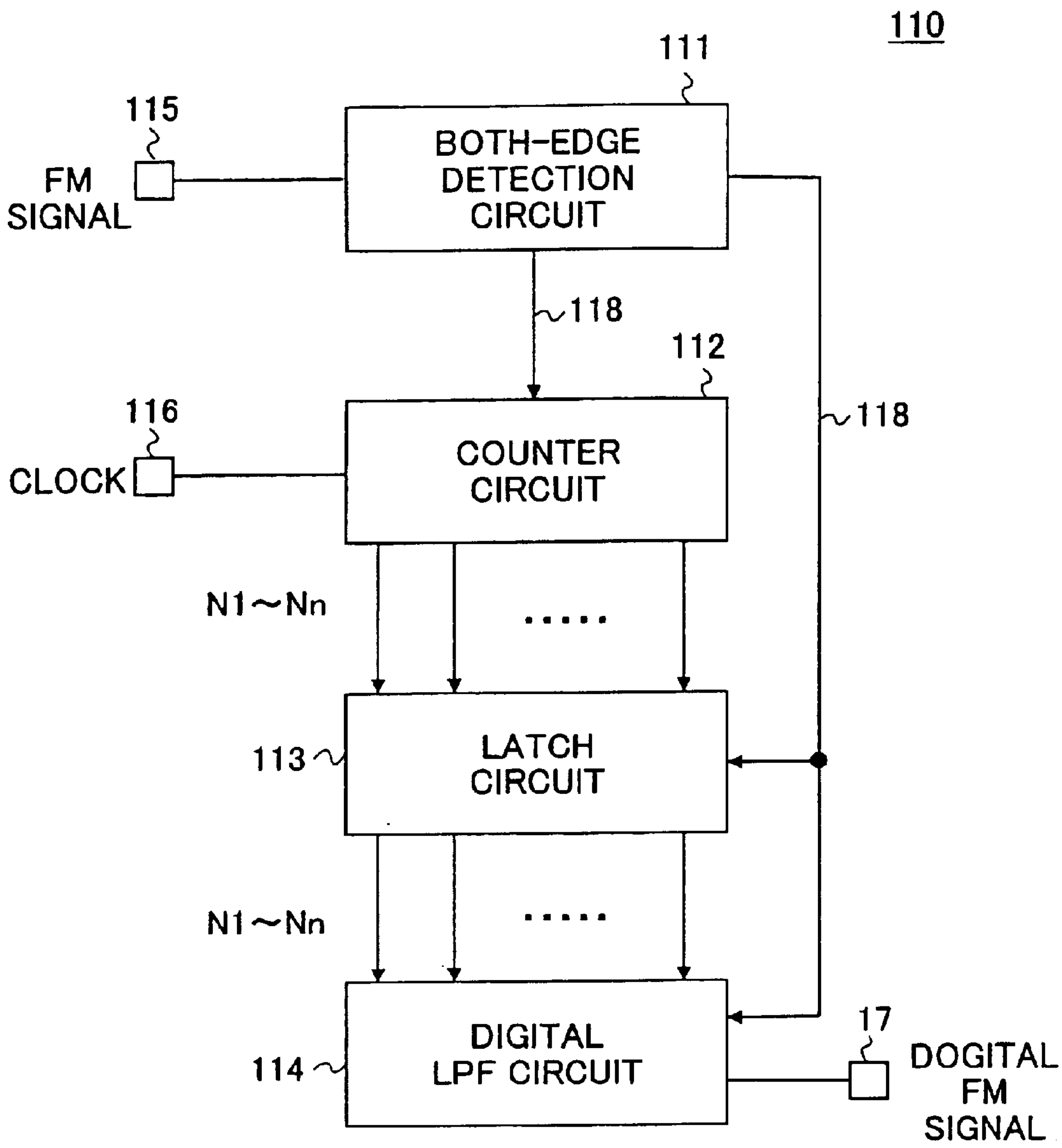
FIG.3 PRIOR ART
FIG. 3 is a block diagram of an example of a conventional signal processing circuit.
Figure 4:
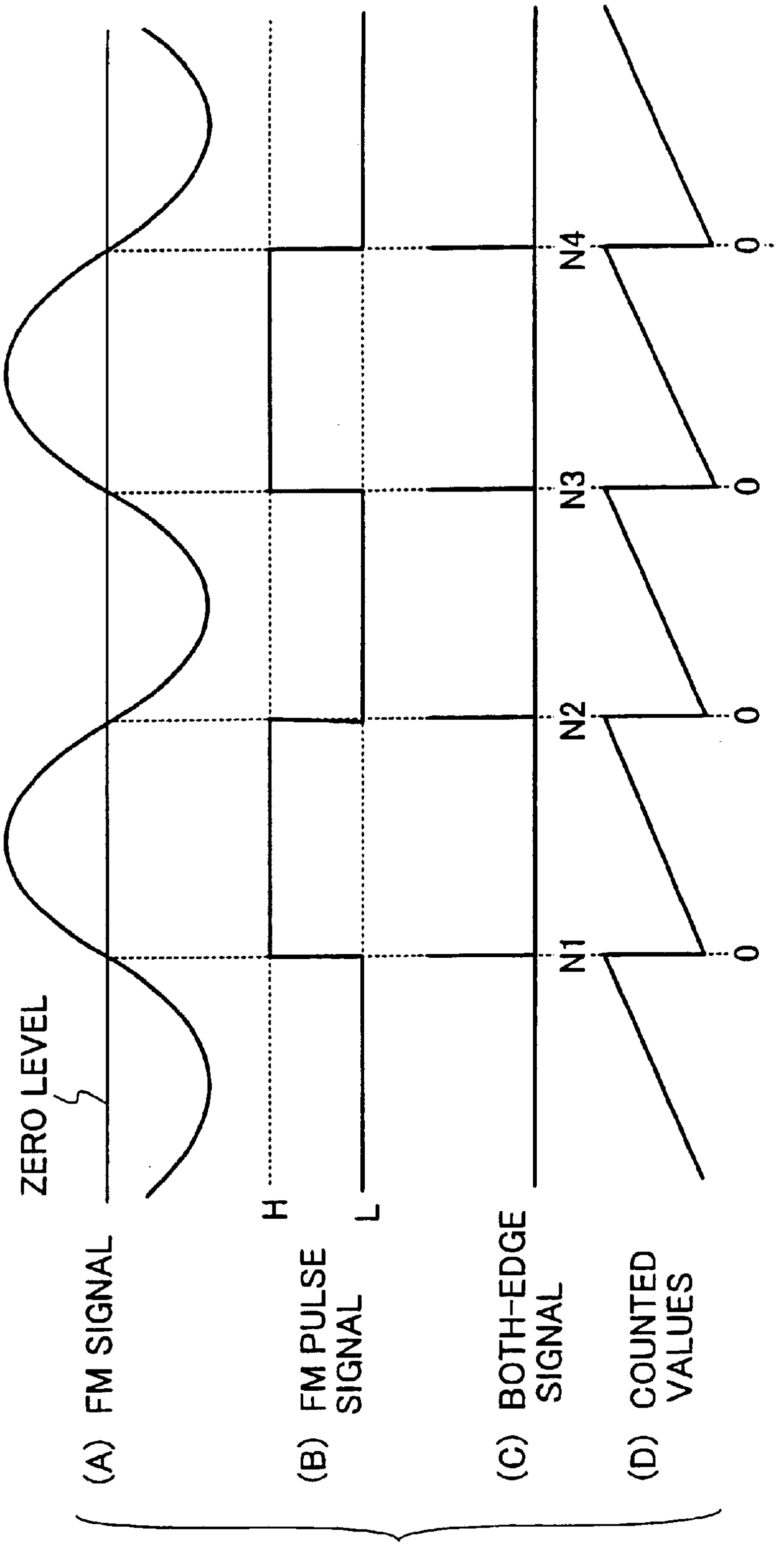
FIG.4 PRIOR ART
FIG. 4 is a timing chart of the conventional signal processing circuit.
Figure 5:
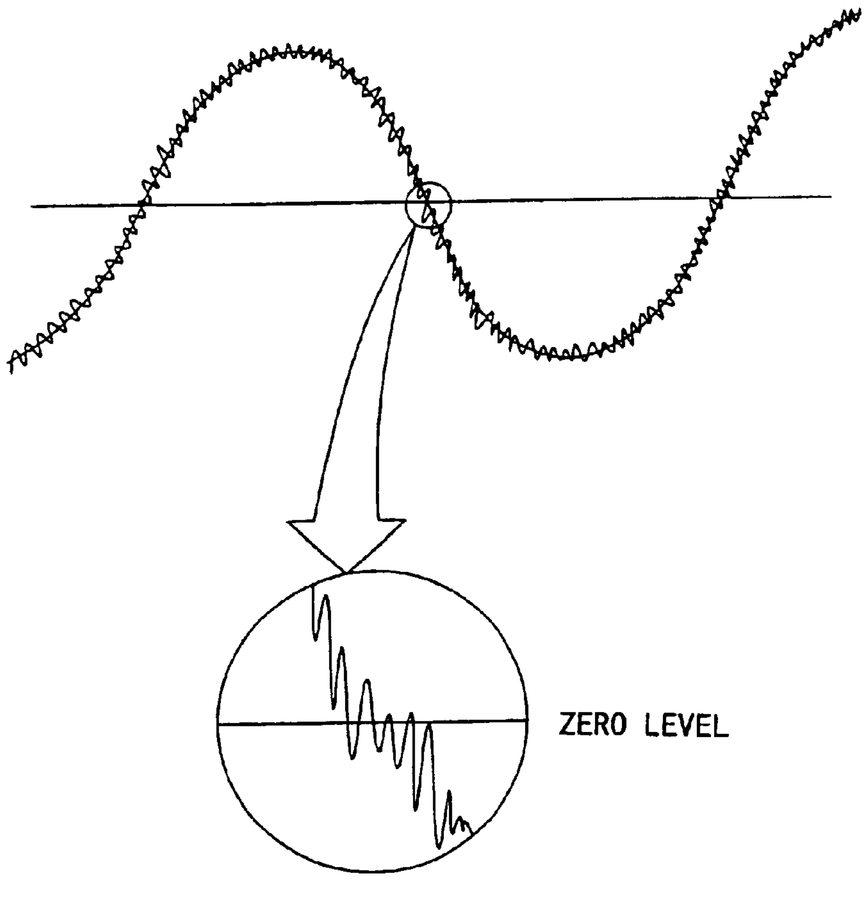
FIG. 5 PRIOR ART
FIG. 5 is a timing chart of a frequency-modulated signal of the conventional signal processing circuit.
Figure 6:
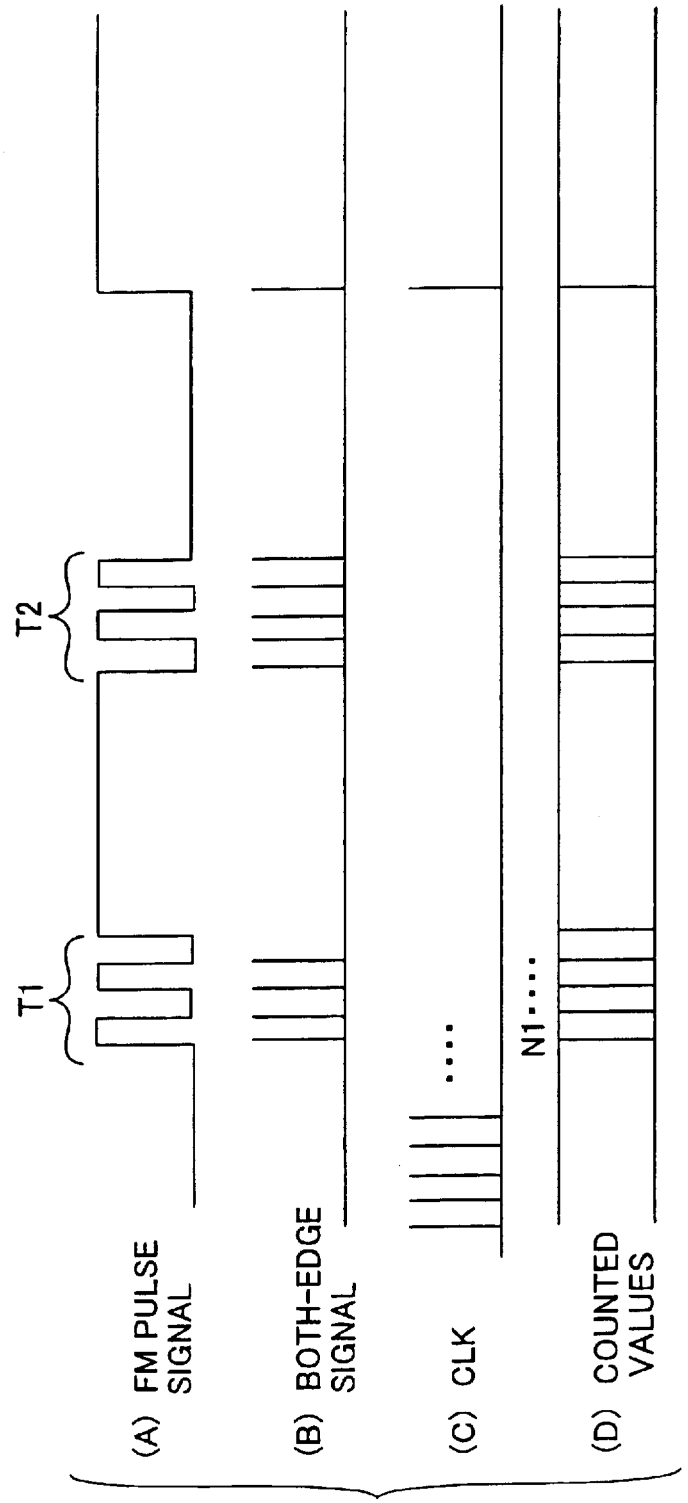
FIG.6 PRIOR ART
FIG. 6 is a timing chart of the conventional signal processing circuit influenced by noises.
Figure 7:
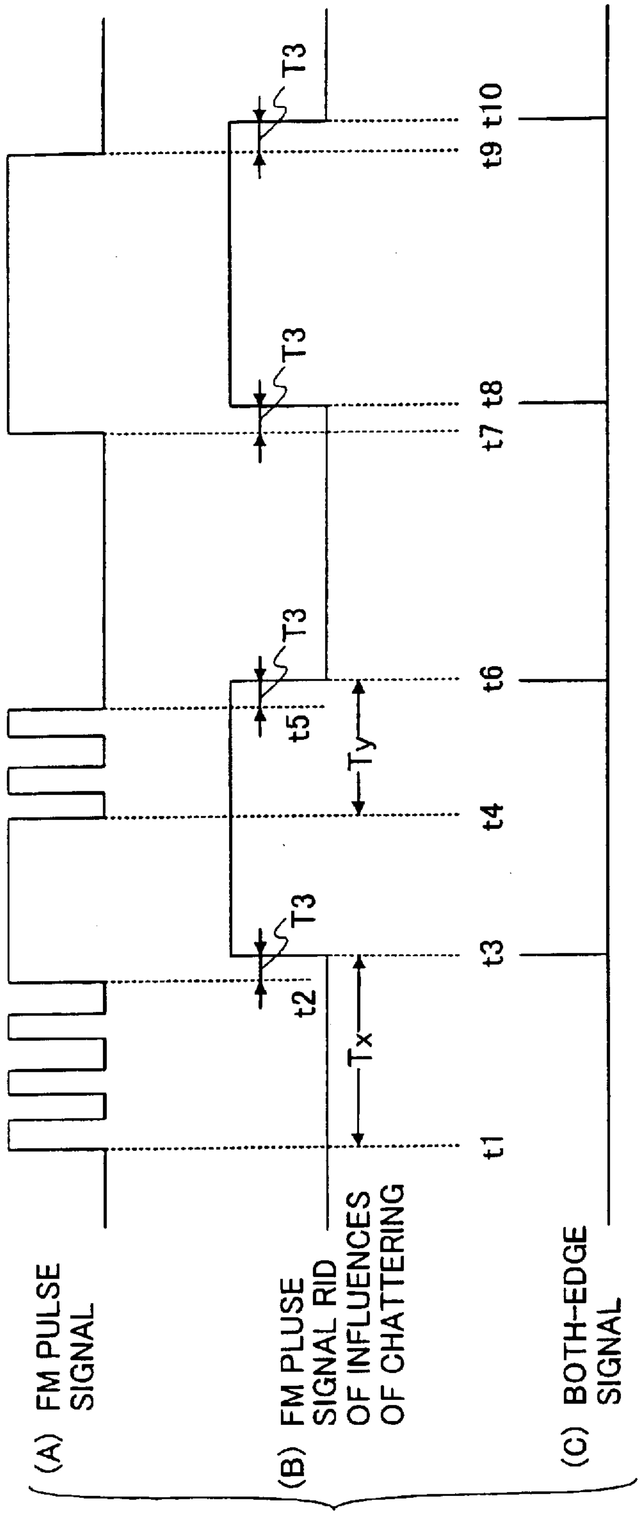
FIG.7 PRIOR ART
FIG. 7 is a timing chart used for describing a conventional method for detecting edges of a pulse signal with excluding periods influenced by noises.

A signal processing circuit 1 is provided in the wobble signal processing unit 48 shown in FIG. 1. The signal processing circuit 1 comprises analog circuits. The signal processing circuit 1 includes constant current sources 11 and 12, analog switch circuits 13 to 19, capacitors 20 to 23, buffer amplifiers 24 and 25, comparators 26 and 27, a latch-circuit/amplifier 28 and a latch-circuit/amplifier 29, one-shot multivibrators (MVs) 30 to 33, an RS flip-flop (RS-FF) 34, a low-pass filter 35, a reference voltage source 36, and an inverter circuit 37. Besides, the capacitors 20 and 21 and other elements compose integrating means. The constant current sources 11 and 12, the analog switch circuits 13 and 14, the capacitors 20 and 21, the inverter circuit 37 and other elements compose a charging circuit of the integrating means. The constant current source 11, the analog switch circuit 13, the capacitor 20 and other elements compose a first charge circuit of the charging circuit. The constant current source 11 composes a first constant current source of the first charge circuit. The analog switch circuit 13 forms a first charging switch circuit of the first charge circuit. The capacitor 20 composes a third capacitor of the first charge circuit. The analog switch circuit 15 composes a first discharging switch circuit of the first charge circuit. The constant current source 12, the analog switch circuit 14, the capacitor 21, the inverter circuit 37 and other elements compose a second charge circuit of the charging circuit. The constant current source 12 composes a second constant current source of the second charge circuit. The analog switch circuit 14 composes a second charging switch circuit of the second charge circuit. The capacitor 21 composes a fourth capacitor of the second charge circuit. The analog switch circuit 16 composes a second discharging switch circuit of the second charge circuit. The analog switch circuits 17 and 18, the capacitors 22 and 23, the buffer amplifiers 24 and 25 and other elements compose a sample hold circuit of the integrating means. The comparator 26 composes a first comparing circuit of the sample hold circuit. The comparator 27 composes a second comparing circuit of the sample hold circuit. The analog switch circuit 18, the capacitor 23, the buffer amplifier 25 and other elements compose a first sample hold circuit of the sample hold circuit. The analog switch circuit 18 composes a first switch circuit of the first sample hold circuit. The capacitor 23 composes a first capacitor of the first sample hold circuit. The analog switch circuit 17, the capacitor 22, the buffer amplifier 24 and other elements compose a second sample hold circuit of the sample hold circuit. The analog switch circuit 17 composes a second switch circuit of the second sample hold circuit. The capacitor 22 composes a second capacitor of the second sample hold circuit. The analog switch circuit 19, the latch-circuit/amplifier 28, the latch-circuit/amplifier 29, the RS flip-flop 34 and other elements compose outputting means (including an output circuit). The analog switch circuit 19 composes a switch circuit of the output circuit. The RS flip-flop 34 composes a switch control circuit of the output circuit.

A description will be given, with reference to FIG. 9, of operations of the signal processing circuit 1.

Figure 9:
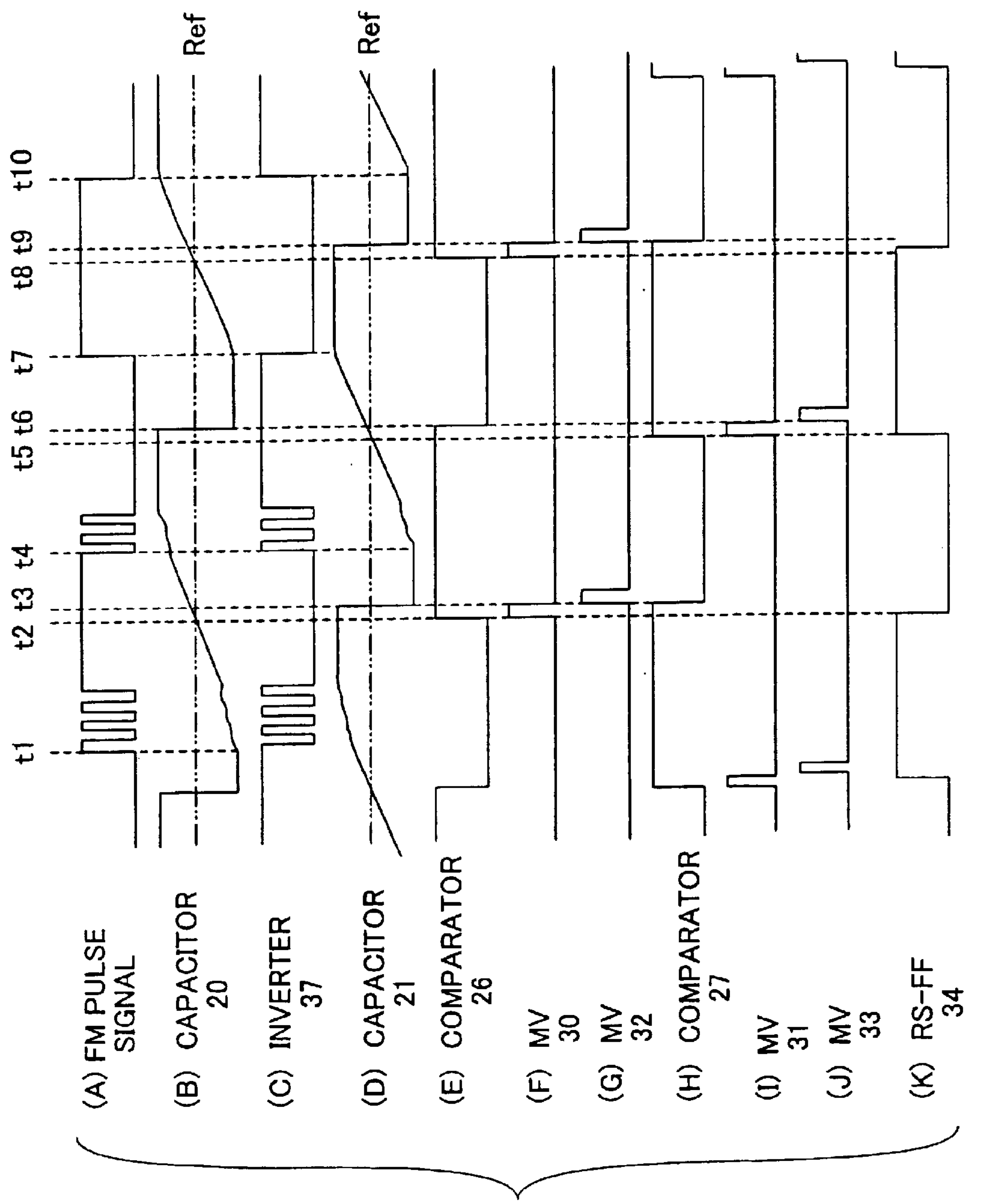
FIG. 9 is a waveform diagram of operations of the signal processing circuit according to the embodiment of the present invention.

FIG. 9 is a waveform diagram of operations of the signal processing circuit 1. FIG. 9-(A) indicates a wobble signal. FIG. 9-(B) indicates changes in a charged voltage of the capacitor 20. FIG. 9-(C) indicates an output of the inverter circuit 37. FIG. 9-(D) indicates changes in a charged voltage of the capacitor 21. FIG. 9-(E) indicates an output of the comparator 26. FIG. 9-(F) indicates an output of the multivibrator 30. FIG. 9-(G) indicates an output of the multivibrator 32. FIG. 9-(H) indicates an output of the comparator 27. FIG. 9-(I) indicates an output of the multivibrator 31. FIG. 9-(J) indicates an output of the multivibrator 33. FIG. 9-(K) indicates an output of the RS flip-flop 34.

The wobble signal indicated by FIG. 9-(A) is a FM (frequency-modulated) pulse signal, and is supplied from a terminal T1 to the analog switch circuit 13, and to the analog switch circuit 14 via the inverter circuit 37. The analog switch circuits 13 and 14 turn on when the pulse signal supplied thereto has a positive polarity, and turn off when the pulse signal supplied thereto has a negative polarity. When the analog switch circuit 13 turns on, the capacitor 20 is charged with a constant current from the constant current source 11. When the analog switch circuit 14 turns on, the capacitor 21 is charged with a constant current from the constant current source 12.

The analog switch circuit 13 turns on when the pulse signal from the terminal T1 exhibits a positive-polarity pulse. The analog switch circuit 14 turns on when the pulse signal from the terminal T1 exhibits a negative-polarity pulse, because the pulse signal from the terminal T1 is inverted by the inverter circuit 37. When the analog switch circuit 13 turns on at a time t1 and a time t7, the capacitor 20 starts to be charged with the constant current from the constant current source 11. In this course, since the capacitor 20 is charged only when the pulse signal from the terminal T1 is a positive-polarity pulse, the charged voltage of the capacitor 20 increases gradually as indicated by FIG. 9-(B) when a chattering occurs, i.e., when positive-polarity pulses are supplied intermittently as shown in FIG. 9-(A) immediately after the time t1 and a time t4.

The charged voltage of the capacitor 20 is amplified by the buffer amplifier 24, and is supplied to the analog switch circuit 17 and to a noninverting input terminal of the comparator 26. A reference voltage is supplied from the reference voltage source 36 to an inverting input terminal of the comparator 26. The comparator 26 makes the output thereof high-level, as indicated by FIG. 9-(E), when an output (the amplified charged voltage) of the buffer amplifier 24 becomes higher than the reference voltage supplied from the reference voltage source 36, i.e., when the charged voltage of the capacitor 20 becomes higher than a predetermined voltage (Ref), as indicated by FIG. 9-(B).

The output of the comparator 26 is supplied to the one-shot multivibrator 30. When the output of the buffer amplifier 24 becomes higher than the reference voltage supplied from the reference voltage source 36 at the time t2 and a time t8 based on the charged voltage of the capacitor 20 so that the output of the comparator 26 becomes high-level, the one-shot multivibrator 30 detects a rise of the output of the comparator 26 from low-level to high-level so as to output a one-shot pulse, as indicated by FIG. 9-(F).

The output (the one-shot pulse) of the one-shot multivibrator 30 is supplied to the analog switch circuit 18, the one-shot multivibrator 32, and the RS flip-flop 34. The analog switch circuit 18 turns on during a period in which the one-shot pulse is supplied from the one-shot multivibrator 30.

When the analog switch circuit 18 turns on, the capacitor 23 is charged with an output voltage of the buffer amplifier 25 so that an output of the buffer amplifier 25, i.e., the charged voltage of the capacitor 21, is sampled. A charged voltage of the capacitor 23 is amplified by the amplifier 29, and is supplied to the analog switch circuit 19.

On the other hand, the RS flip-flop 34 is reset by a rise of the one-shot pulse supplied from the one-shot multivibrator 30 so that the output of the RS flip-flop 34 becomes low-level, as indicated by FIG. 9-(K). The output of the RS flip-flop 34 is used as a switching signal of the analog switch circuit 19. The analog switch circuit 19 selects an output of the amplifier 28 when the output of the RS flip-flop 34 is high-level, and selects an output of the amplifier 29 when the output of the RS flip-flop 34 is low-level. Accordingly, when the output of the RS flip-flop 34 becomes low-level at the time t2, the analog switch circuit 19 selects the output of the amplifier 29, i.e., the charged voltage of the capacitor 23, and supplies the output of the amplifier 29 to the low-pass filter 35.

When the one-shot multivibrator 32 detects falls of the one-shot pulse output from the one-shot multivibrator 30 at a time t3 and a time t9, the one-shot multivibrator 32 outputs a one-shot pulse, as indicated by FIG. 9-(G). The one-shot pulse output from the one-shot multivibrator 32 is supplied to the analog switch circuit 16. The analog switch circuit 16 turns on in response to the one-shot pulse. When the analog switch circuit 16 turns on, the capacitor 21 is discharged, as indicated by FIG. 9-(D).

When the input pulse signal supplied to the terminal T1 becomes low-level at the time t4, the analog switch circuit 13 turns off, and the analog switch circuit 14 turns on. When the analog switch circuit 14 turns on, the capacitor 21 is charged with the constant current from the constant current source 12 so that the charged voltage of the capacitor 21 increases as indicated by FIG. 9-(D).

The charged voltage of the capacitor 21 is amplified by the buffer amplifier 25, and is supplied to a noninverting input terminal of the comparator 27. The comparator 27 compares an output (the amplified charged voltage) of the buffer amplifier 25 with the reference voltage supplied from the reference voltage source 36, and makes the output thereof high-level as indicated by FIG. 9-(H), when the output of the buffer amplifier 25 becomes higher than the reference voltage supplied from the reference voltage source 36, i.e., when the charged voltage of the capacitor 21 becomes higher than the predetermined voltage (Ref), as indicated by FIG. 9-(D). The output of the comparator 27 is supplied to the one-shot multivibrator 31. The one-shot multivibrator 31 outputs a one-shot pulse according to the output of the comparator 27, as indicated by FIG. 9-(I). The output (the one-shot pulse) of the one-shot multivibrator 31 is supplied to the analog switch circuit 17, the one-shot multivibrator 33, and the RS flip-flop 34. The analog switch circuit 17 turns on during a period of the one-shot pulse supplied from the one-shot multivibrator 31. During a period in which the analog switch circuit 17 is on, the capacitor 22 is charged with the output of the buffer amplifier 24. A charged voltage of the capacitor 22 is amplified by the amplifier 28, and is supplied to the analog switch circuit 19.

On the other hand, the RS flip-flop 34 is set by the one-shot pulse supplied from the one-shot multivibrator 31. When the RS flip-flop 34 is set, the RS flip-flop 34 makes the output thereof high-level, as indicated by FIG. 9-(K). When the output of the RS flip-flop 34 becomes high-level, the analog switch circuit 19 selects the output of the amplifier 28, and supplies the output of the amplifier 28 to the low-pass filter 35.

The multivibrator 33 outputs a one-shot pulse at a time t6, as indicated by FIG. 9-(J), in response to a fall of the one-shot pulse output from the one-shot multivibrator 31. The one-shot pulse output from the multivibrator 33 is supplied to the analog switch circuit 15. The analog switch circuit 15 turns on during a period of the one-shot pulse. When the analog switch circuit 15 turns on, the capacitor 20 is discharged, as indicated by FIG. 9-(B).

As described above, since the capacitors are gradually charged during a boundary period including noises between a low level and a high level of the wobble signal, influences of noises are alleviated (buffered) so that a high-level period and a low-level period of the wobble signal are accurately detected.

Although the signal processing circuit 1 according to the present embodiment comprises the constant current source 11 and the analog switch circuit 13 used for charging the capacitor 20 upon the pulse signal having a positive polarity, and comprises the inverter circuit 37, the constant current source 12 and the analog switch circuit 14 used for charging the capacitor 21 upon the pulse signal having a negative polarity, the charging can be controlled by using a single switch.

Figure 10:
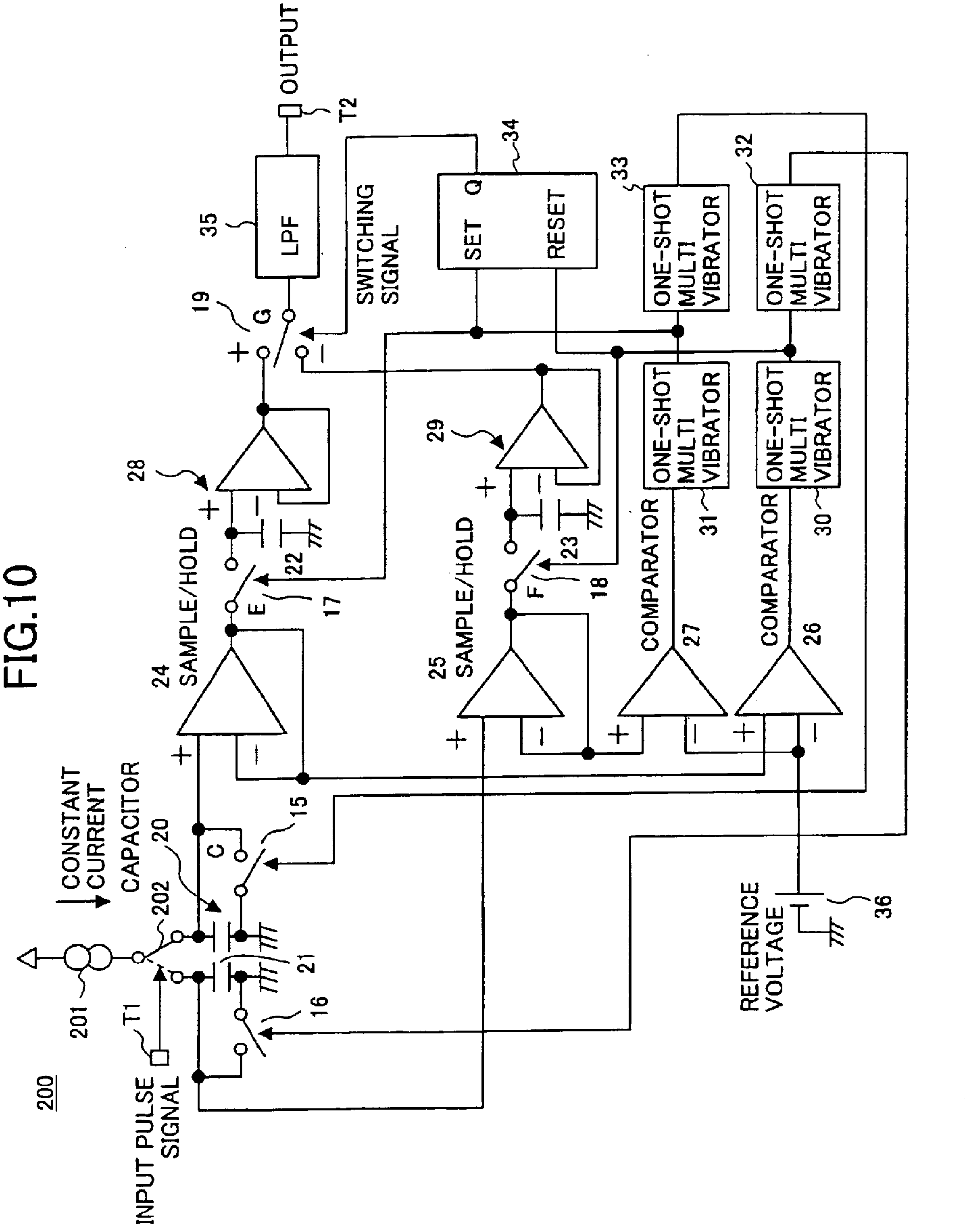
FIG. 10 is a block diagram of a variation of the signal processing circuit according to the embodiment of the present invention.

FIG. 10 is a block diagram of a variation of the signal processing circuit according to the above-described embodiment of the present invention. Elements in FIG. 10 that are identical to the elements shown in FIG. 8 are referenced by the same reference marks, and will not be described in detail.

A signal processing circuit 200 according to the present variation comprises a constant current source 201 and a switch 202, in place of the constant current sources 11 and 12, the analog switch circuits 13 and 14, and the inverter circuit 37 shown in FIG. 8. Besides, in the present variation, the capacitors 20 and 21 compose first and second charge elements of the charging circuit.

The switch 202 supplies the capacitor 20 with a constant current from the constant current source 201 when the input pulse signal supplied to the terminal T1 is high-level, and supplies the capacitor 21 with the constant current from the constant current source 201 when the input pulse signal supplied to the terminal T1 is low-level.

According to the present variation, the signal processing circuit 200 has a simpler configuration than the signal processing circuit 1 shown in FIG. 8 for performing similar operations.

Besides, although the present embodiment is described as being applied to an optical disk device, the present invention is not limited thereto, but is preferably applicable to an instance of detecting a high-level period and a low-level period of a pulse signal.

The present invention is not limited to the specifically disclosed embodiments, and variations and modifications may be made without departing from the scope of the present invention.

The present application is based on Japanese priority applications No. 2001-044223 filed on Feb. 20, 2001, and No. 2001-333102 filed on Oct. 30, 2001, the entire contents of which are hereby incorporated by reference.

What is claimed is:

1. A signal processing circuit outputting an output signal corresponding to a pulse width of an input pulse signal, the circuit comprising:

a first and second charging circuit, means for applying a gradually changing charge on said first charging circuit when said input pulse signal is of positive polarity and for applying a gradually changing charge on said second charging circuit when said input pulse signal is of negative polarity for a predetermined period of time including at least one pulse which permits a noise component to be superimposed thereon;

means for sampling and holding the charge accumulated in each of the first and second charging circuits so as to generate said output signal; and outputting means for outputting the output signal corresponding to the pulse width of each input pulse based on the charge accumulated in one of the first and second charging circuits.

2. The signal processing circuit as claimed in claim 1, wherein said means for sampling and holding comprises a sample hold circuit for sampling and holding the charged voltage stored according to one of said polarities, during a period of supply of said input pulse signal having the other of said polarities in which no chattering is generated.

3. The signal processing circuit as claimed in claim 2, wherein said first and second charging circuit includes:

a first comparing circuit comparing a charged voltage of said first charging circuit with a reference voltage;

a second comparing circuit comparing a charged voltage of said second charging circuit with a reference voltage;

a first sample hold circuit sampling and holding said charged voltage of said second charging circuit, based on a comparison result of said first comparing circuit; and a second sample hold circuit sampling and holding said charged voltage of said first charging circuit, based on a comparison result of said second comparing circuit, and wherein said outputting means outputs a first sampled and held voltage in said first sample hold circuit, according to said comparison result of said first comparing circuit, and outputs a second sampled and held voltage in said second sample hold circuit, according to said comparison result of said second comparing circuit.

4. The signal processing circuit as claimed in claim 3, wherein said first sample hold circuit includes a first switch circuit switched according to said comparison result of said first comparing circuit; and a first capacitor charged according to said charged voltage of said second charge circuit, when said first switch circuit is switched on, and said second sample hold circuit includes a second switch circuit switched according to said comparison result of said second comparing circuit; and a second capacitor charged according to said charged voltage of said first charge circuit, when said second switch circuit is switched on.

5. The signal processing circuit as claimed in claim 3, wherein said first charge circuit includes a first constant current source outputting the constant current;

a first charging switch circuit switched on when said input pulse signal has a positive polarity so as to output said constant current output from said first constant current source;

a third capacitor charged with said constant current output from said first charging switch circuit, when said first charging switch circuit is switched on; and a first discharging switch circuit switched on according to said comparison result of said second comparing circuit so as to discharge said third capacitor, and said second charge circuit includes a second constant current source outputting the constant current;

a second charging switch circuit switched on when said input pulse signal has a negative polarity so as to output said constant current output from said second constant current source;

a fourth capacitor charged with said constant current output from said second charging switch circuit, when said second charging switch circuit is switched on; and a second discharging switch circuit switched on according to said comparison result of said first comparing circuit so as to discharge said fourth capacitor.

6. The signal processing circuit as claimed in claim 4, wherein said first charge circuit includes a first constant current source outputting the first constant current;

a first charging switch circuit switched on when said input pulse signal has a positive polarity so as to output said first constant current output from said first constant current source;

a third capacitor charged with said constant current output from said first charging switch circuit, when said first charging switch circuit is switched on; and a first discharging switch circuit switched on according to said comparison result of said second comparing circuit so as to discharge said third capacitor, and said second charge circuit includes a second constant current source outputting the second constant current;

a second charging switch circuit switched on when said input pulse signal has a negative polarity so as to output said second constant current output from said second constant current source;

a fourth capacitor charged with said constant current output from said second charging switch circuit, when said second charging switch circuit is switched on; and a second discharging switch circuit switched on according to said comparison result of said first comparing circuit so as to discharge said fourth capacitor.

7. The signal processing circuit as claimed in claim 2, wherein said charging circuit includes a constant current source generating a constant current; a first charge element charged with said constant current;

a second charge element charged with said constant current; and a switch switched according to said input pulse signal so as to supply said first charge element with said constant current generated by said constant current source when said input pulse signal has the one of said polarities, and to supply said second charge element with said constant current generated by said constant current source when said input pulse signal has the other of said polarities.

8. The signal processing circuit as claimed in claim 2, wherein said outputting means comprises an output circuit outputting a voltage sampled and held in said sample hold circuit as the output signal.

9. The signal processing circuit as claimed in claim 3, wherein said outputting means comprises an output circuit outputting the voltage sampled and held in one of said first sample hold circuit and said second sample hold circuit, as the output signal.

10. The signal processing circuit as claimed in claim 4, wherein said outputting means comprises an output circuit outputting the voltage sampled and held in one of said first sample hold circuit and said second sample hold circuit, as the output signal.

11. The signal processing circuit as claimed in claim 5, wherein said outputting means comprises an output circuit outputting the voltage sampled and held in one of said first sample hold circuit and said second sample hold circuit, as the output signal.

12. The signal processing circuit as claimed in claim 6, wherein said outputting means comprises an output circuit outputting the voltage sampled and held in one of said first sample hold circuit and said second sample hold circuit, as the output signal.

13. The signal processing circuit as claimed in claim 7, wherein said outputting means comprises an output circuit outputting a voltage sampled and held in said sample hold circuit as the output signal.

14. The signal processing circuit as claimed in claim 9, wherein said output circuit includes a switch circuit selectively outputting either of said voltage sampled and held in said first sample hold circuit and said voltage sampled and held in said second sample hold circuit; and a switch control circuit switching said switch circuit so as to select said voltage sampled and held in said first sample hold circuit according to said comparison result of said first comparing circuit, and to select said voltage sampled and held in said second sample hold circuit according to said comparison result of said second comparing circuit.

15. The signal processing circuit as claimed in claim 10, wherein said output circuit includes a switch circuit selectively outputting either of said voltage sampled and held in said first sample hold circuit and said voltage sampled and held in said second sample hold circuit; and a switch control circuit switching said switch circuit so as to select said voltage sampled and held in said first sample hold circuit according to said comparison result of said first comparing circuit, and to select said voltage sampled and held in said second sample hold circuit according to said comparison result of said second comparing circuit.

16. The signal processing circuit as claimed in claim 11, wherein said output circuit includes a switch circuit selectively outputting either of said voltage sampled and held in said first sample hold circuit and said voltage sampled and held in said second sample hold circuit; and a switch control circuit switching said switch circuit so as to select said voltage sampled and held in said first sample hold circuit according to said comparison result of said first comparing circuit, and to select said voltage sampled and held in said second sample hold circuit according to said comparison result of said second comparing circuit.

17. The signal processing circuit as claimed in claim 12, wherein said output circuit includes a switch circuit selectively outputting either of said voltage sampled and held in said first sample hold circuit and said voltage sampled and held in said second sample hold circuit; and a switch control circuit switching said switch circuit so as to select said voltage sampled and held in said first sample hold circuit according to said comparison result of said first comparing circuit, and to select said voltage sampled and held in said second sample hold circuit according to said comparison result of said second comparing circuit.

18. A signal processing method for outputting an output signal corresponding to a pulse width of an input pulse signal, the method comprising:

a step of gradually changing the charge in a first charging circuit when said input pulse signal is of positive polarity and gradually changing the charge in a second charging circuit when said input pulse signal is of negative polarity for a period of time to permit a noise component to be superimposed on at least one pulse;

a step of sampling and holding the charge accumulated in each of the first and second charging circuits so as to generate said output signal; and a step of outputting the output signal corresponding to the pulse width of each input pulse based on the charge accumulated in one of the first and second charging circuits.

* * * * *